United States Statutory Invention Registration [19]

[11] Reg. Number: H882

Fox [43] Published: Jan. 1, 1991

[54] MULTIPLE-SECTION PULSED GAS LASER

[76] Inventor: Clifton S. Fox, 12014 William and Mary Cir., Woodbridge, Va. 22192

[21] Appl. No.: 359,602

[22] Filed: Jun. 1, 1989

[51] Int. Cl.[5] ..... H01S 3/03

[52] U.S. Cl. ..... 372/62; 372/68; 372/87; 372/97

[58] Field of Search ..... 372/55, 61, 62, 68, 372/87, 92, 97

[56] References Cited

U.S. PATENT DOCUMENTS 3,460,053 8/1969 Leonard ..... 372/62
4,481,632 11/1984 Herbrich et al. ..... 372/61

FOREIGN PATENT DOCUMENTS 0053472 4/1980 Japan ..... 372/61
0283184 12/1986 Japan ..... 372/62

*Primary Examiner*—Thomas H. Tarcza

*Assistant Examiner*—Linda J. Wallace

[57] ABSTRACT

Several gas-tight enclosures share a common optical cavity. The enclosures may be filled with neat gases or mixtures of gasses. The same gas or mixture, at the same or a different pressure, may occur in more than one enclosure. The gas or gasses in the various enclosures may be pulsed to lase in any desired sequence, simultaneously, or in any combination.

4 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

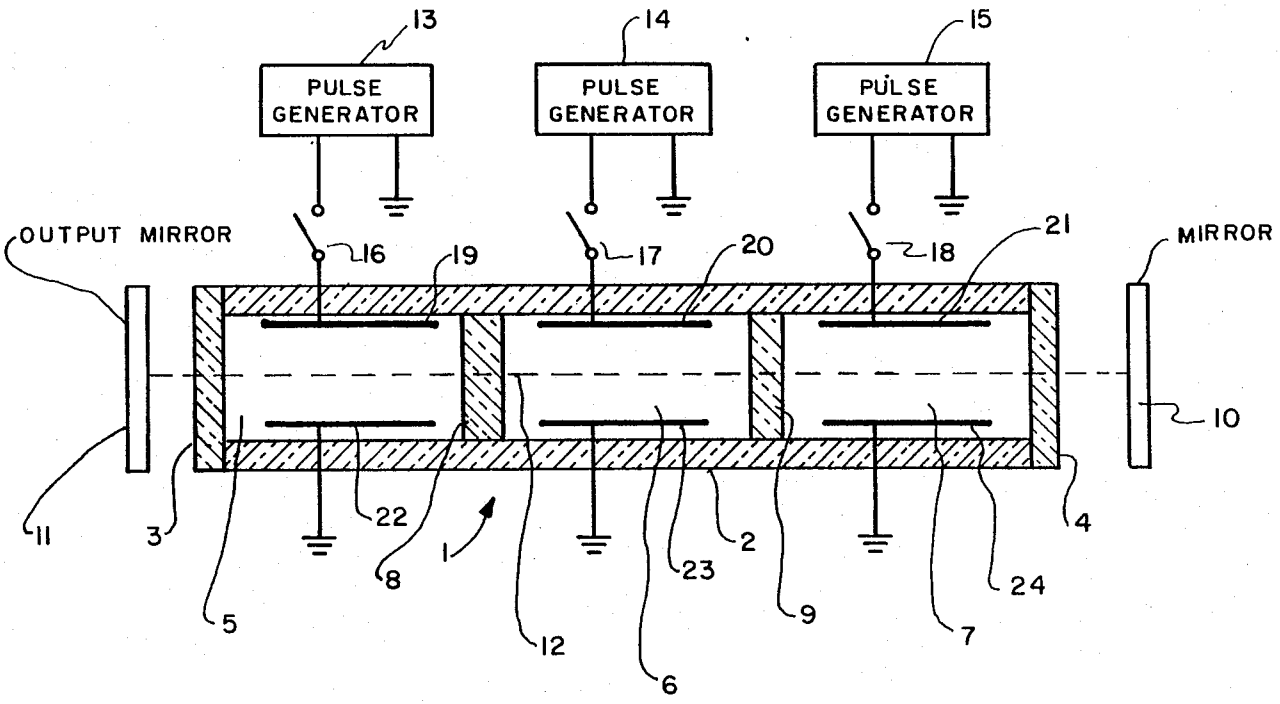
MIRROR
10
4
21
24
15
PULSE GENERATOR
18
7
9
20
2
14
PULSE GENERATOR
17
23
6
12
1
19
13
PULSE GENERATOR
16
8
22
5
3
OUTPUT MIRROR
11

MULTIPLE-SECTION PULSED GAS LASER

The invention described herein may be manufactured, used, and licensed by the U.S. Government for Governmental purposes without the payment of any royalties thereon.

BACKGROUND OF THE INVENTION

This invention is in the field of pulsed gas laser, and is particularly concerned with lasers capable of providing pulses of laser light at different wavelengths, and/or pulse shapes and power levels from a single laser cavity. Presently, in order to obtain multiple laser wavelengths and/or pulse characteristics, it is necessary to either use multiple lasers, or some means to tune a single laser discharge section. Unfortunately, both of these techniques have disadvantages. Multiple lasers require various beam-combining means to obtain an output beam on a particular path; these means are both costly and use space. A laser consisting of a discharge section with a tuning mechanism has severe limitations of interpulse time, spectral range, and discharge characteristics, since only a single gas mixture can be used at one time and recovery or recirculation time is needed between pulses. The instant invention overcomes these disadvantages.

SUMMARY OF THE INVENTION

The invention is a multiple-section pulsed gas laser with a plurality of gas-tight enclosures in a single optical cavity. The enclosures are filled with gases, either neat or mixtures, capable of lasing. For different spectra or pulse characteristics, different gases or mixtures may be used. Alternatively, more than one enclosure may contain the same gas or mixture, if higher power or pulse rates are desired.

BRIEF DESCRIPTION OF THE DRAWINGS

The single drawing FIGURE is a schematic representation of the invention, partly in section.

DESCRIPTION OF PREFERRED EMBODIMENTS

Referring now to the drawing, we see a housing generally designated 1. This housing consists of an elongated tube 2 with transparent end caps 3 and 4. Within the housing are enclosures 5,6, and 7 defined by tube 2, end caps 3 and 4 and transparent plugs 8 and 9. Each of enclosures 5,6, and 7 contain a gaseous material such as a neat gas or mixture of gases capable of lasing when appropriately excited (pumped). Obviously, the same gas or mixture may be used in more than one enclosure, at the same or different pressure. Housing 1 is within an optical cavity defined by mirrors 10 (100% reflective) and 11 (partially reflective) and having an optical axis

12; each of enclosures 5, 6, and 7 is colinear with axis 12. The gas (or gasses) in enclosures 5,6, and 7 are pumped from pulse generators 13,14, and 15 via switches 16,17, and 18 connected to discharge terminals 19,20, and 21. The discharge current returns through grounded terminals 22, 23, and 24. It should be understood that the (13,14,15)/(16,17,18) combination is merely representative, and that some means obvious to ones skilled in the art may be used therefor; depending upon the particular manner in which lasing in enclosures 5,6, and 7 is desired. For example, the combination mentioned above may be computer controlled such that 5,6, and 7 may be operated simultaneously or in any desired sequence or combination.

Operation of the invention laser is straightforward: desired pulse generators 13,14, and 15 are connected to discharge electrodes 19,20, and 21 as desired by switches 16,17 and 18 to pump the gaseous material in each selected enclosure. Lasing occurs in the pumped gaseous material(s) and an output beam passes along axis 12 out through output mirror 11. Although not shown, it should be obvious that end caps 3 and 4 and plugs 8 and 9 may be set at Brewster's angle for a given polarization of the laser output.

In view of the above description, the advantages of this invention over the prior art can be seen. Specifically, the use of multiple, independent-discharge section in a single laser cavity eliminates the need for external beam combining optics and saves associated cost and space. Interpulse time can be made as short as desired because different discharge sections may be used to generate sequential pulses rather than having to wait for gas recovery within a single discharge section. Also, flexibility is gained in spectral coverage and pulse characteristic because different gas mixture (including isotopes), different gas pressures and different gain lengths may be used in each section. More optical output coupling can also be achieved for low gain spectral lines by making the gain sections longer for those lines than for higher gain laser lines.

I claim:

1. A multiple-section pulsed gas laser consisting of an optical cavity with an optical axis therein, a plurality of gas tight enclosures colinear to said axis, a gaseous material capable of lasing in each of said enclosures, and individual selectable means for pumping the material in a respective enclosure to cause lasing of the material therein.

2. The laser as set forth in claim 1 wherein a material in a particular enclosure is neat gas.

3. The laser as set forth in claim 1 wherein a material in a particular enclosure is a mixture of gasses.

4. The laser as set forth in claim 1 wherein more than one enclosure contains the same material.

* * * * *